US008287826B2

(12) United States Patent
Pettey

(10) Patent No.: US 8,287,826 B2
(45) Date of Patent: Oct. 16, 2012

(54) SELECTIVE-CATION-REMOVAL PURIFICATION OF ALUMINUM SOURCE

(75) Inventor: Lucas Pettey, Austin, TX (US)

(73) Assignee: EEStor, Inc., Cedar Park, TX (US)

( * ) Notice: Subject to any disclaimer, the term of this patent is extended or adjusted under 35 U.S.C. 154(b) by 113 days.

(21) Appl. No.: 12/885,290

(22) Filed: Sep. 17, 2010

(65) Prior Publication Data
US 2011/0070133 A1 Mar. 24, 2011

Related U.S. Application Data

(60) Provisional application No. 61/243,916, filed on Sep. 18, 2009.

(51) Int. Cl.
C01F 7/00 (2006.01)
(52) U.S. Cl. ......... 423/127; 423/131; 423/132; 423/629
(58) Field of Classification Search .......... 423/122–129, 423/131, 132, 629
See application file for complete search history.

(56) References Cited

U.S. PATENT DOCUMENTS

| 4,275,847 | A | | 6/1981 | Bahr et al. | |
|---|---|---|---|---|---|
| 4,671,618 | A | | 6/1987 | Wu et al. | |
| 4,834,952 | A | | 5/1989 | Rollat et al. | |
| 4,849,190 | A | * | 7/1989 | de Castro Morshbacker et al. ............................. | 423/124 |
| 5,017,446 | A | | 5/1991 | Reichman et al. | |
| 5,045,170 | A | | 9/1991 | Bullock et al. | |
| 5,340,510 | A | | 8/1994 | Bowen | |
| 5,929,259 | A | | 7/1999 | Lockemeyer | |
| 6,048,470 | A | * | 4/2000 | Nakahara et al. ............. | 423/628 |
| 7,068,898 | B2 | | 6/2006 | Buretea et al. | |
| 7,237,634 | B2 | | 7/2007 | Severinsky et al. | |
| 2001/0010367 | A1 | | 8/2001 | Burnell-Jones | |

FOREIGN PATENT DOCUMENTS

| CA | 02598787 | | 3/2008 |
|---|---|---|---|
| CA | 02598754 | | 4/2008 |
| JP | 55-024990 | A | 2/1980 |
| JP | 55154321 | | 12/1980 |
| JP | 59-179722 | A | 10/1984 |
| JP | 11-140555 | A | 5/1999 |
| JP | 11147716 | | 6/1999 |
| JP | 2000-178663 | A | 6/2000 |
| JP | 2003192343 | | 7/2003 |
| WO | 9316012 | | 8/1993 |
| WO | 2008031189 | A1 | 3/2008 |
| WO | 2008031189 | B1 | 3/2008 |
| WO | 2008040114 | A1 | 4/2008 |

OTHER PUBLICATIONS

F. Sears et al., "Capacitance—Properties of Dielectrics", University of Physics, Addison Wesley Publishing Company, Inc., Feb. 1984, pp. 516-533.
J. Kuwata et al., "Electrical Properties of Perovskite-Type Oxide Thin-Films Prepared by RF Sputtering", Jpn J. Appl. Phys., Part 1, 1985, 413-415.
Bruno et al., "High-Performance Multilayer Capacitor Dielectrics from Chemically Prepared Powders", Journal of the American Ceramic Society, vol. 76, No. 5, pp. 1233-1241, 1993.
Mitsubishi Polyester Film Corporation specification sheet for Hostaphan (R) RE film for capacitors, Copyright 2007.
Beheir et al., "Studies on the liquid-liquid extraction and ion and precipitate flotation of Co(IIi) with decanoic acid", Journal of Radioanalytical and Nuclear Chemistry, Articles, vol. 174m, No. 1 (1992) 13-22.
International Search Report and Written Opinion mailed May 25, 2011 from International Application No. PCT/US2010/049374 filed Sep. 17, 2010.
Magtoto et al. "Dielectric breakdown of ultrathin aluminum oxide films induced by scanning tunneling microscopy", Applied Physics Letters, vol. 77, Issue 14 (2000), 3 pages.
J.M. Herbert, "Ceramic Dielectrics and Capacitors", vol. 6 (1985), pp. 222-223.

* cited by examiner

Primary Examiner — Steven Bos
(74) Attorney, Agent, or Firm — Abel Law Group, LLP

(57) ABSTRACT

A method of purifying an aluminum source includes dissolving an aluminum ion source to provide a first solution including aluminum ions having a pH of not greater than 4.0, adjusting the pH of the first solution with a tetraalkylammonium hydroxide solution to a pH in range of 4.1 to 8.4 thereby forming an aluminum hydroxide precipitate, separating the aluminum hydroxide precipitate from the first solution, washing the separated aluminum hydroxide precipitate with an aqueous solution having a pH in a range of 4.1 to 8.4, dissolving the washed aluminum hydroxide precipitate using an acid to provide a second solution having a pH of not greater than 4.0, and forming an aluminum salt from the second solution.

23 Claims, 1 Drawing Sheet

SELECTIVE-CATION-REMOVAL PURIFICATION OF ALUMINUM SOURCE

CROSS-REFERENCE TO RELATED APPLICATION(S)

The present application claims priority from U.S. Provisional Patent Application No. 61/243,916, filed Sep. 18, 2009, entitled "SELECTIVE-CATION-REMOVAL PURIFICATION OF ALUMINUM NITRATE," naming inventor Lucas Pettey, which application is incorporated by reference herein in its entirety.

FIELD OF THE DISCLOSURE

This disclosure, in general relates to methods for the purification of aluminum nitrate.

BACKGROUND

Alumina, also know as corundum, ranks among the hardest, the most refractory, and the most corrosion-resistant materials. Alumina is a hard oxide.

When used as a coating, alumina can prevent oxygen transport. Under strong electrical fields, alumina, by preventing oxygen transport, can prevent oxygen depletion in ceramic materials. However, impurities in the alumina can lead to degradation in other properties, such as resistivity and voltage breakdown.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

In an exemplary embodiment, alumina forms a coating over a composition-modified barium titanate particle. The alumina is derived from aluminum nitrate having low impurities. The aluminum nitrate may be formed by a process including precipitation.

In particular, undesirable impurities in alumina ceramics include univalent cations, such as $Na^+$ and $K^+$, typically present in large amounts, and $Li^+$, $Rb^+$, and $Cs^+$, typically present in small amounts. These univalent ions are mobile upon application of an electric field to the ceramic body, causing an ion current.

By precipitation of hydrous aluminum hydroxide [Al(OH)$_3$·xH$_2$O] from the aluminum nitrate aqueous solution with the use of a tetraalkylammonium hydroxide, such as tetramethylammonium hydroxide [(CH$_3$)$_4$NOH], as the precipitant, not only are the univalent cations left in solution, but also some divalent cations, $Ba^{+2}$, $Sr^{+2}$, and $Ca^{+2}$ are left in solution, because the hydroxides of all these cations are water-soluble, the $Ca^{+2}$ less so than the other divalent cations.

The hydrous hydroxide formed by precipitation of aluminum ions ($Al^{+3}$) from an aqueous solution is also stable over the pH range of 4.0 to 8.5, dissolving below pH 4 and above pH 8.5, as follows:

Below pH 4

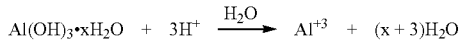

Above pH 8.5

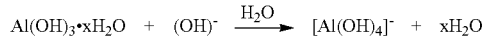

To prepare an aluminum ion composition having desirable purity and being substantially free of impurities, aluminum hydroxide is precipitated in the presence of tetraalkylammonium hydroxide and the precipitated aluminum hydroxide is washed. For example, an aluminum ion source can be dissolved under acidic conditions to provide a solution including aluminum ions. The pH of the solution can be increased by adding tetraalkylammonium hydroxide, leading to the precipitation of aluminum hydroxide. The aluminum hydroxide precipitate can be concentrated and washed, such as with an aqueous solution. The precipitate is then dissolved using an acidic solution. Optionally, the aluminum ions can be precipitated to form a salt with the acid anion.

Figure 1:
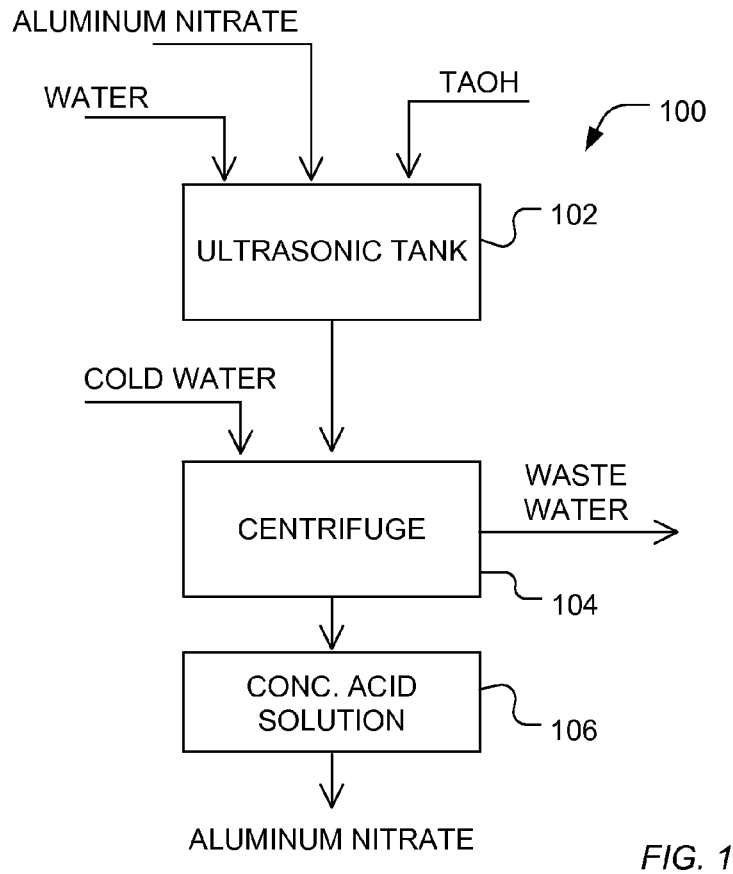
FIG. 1 includes an illustration of a process flow.
Figure 2:
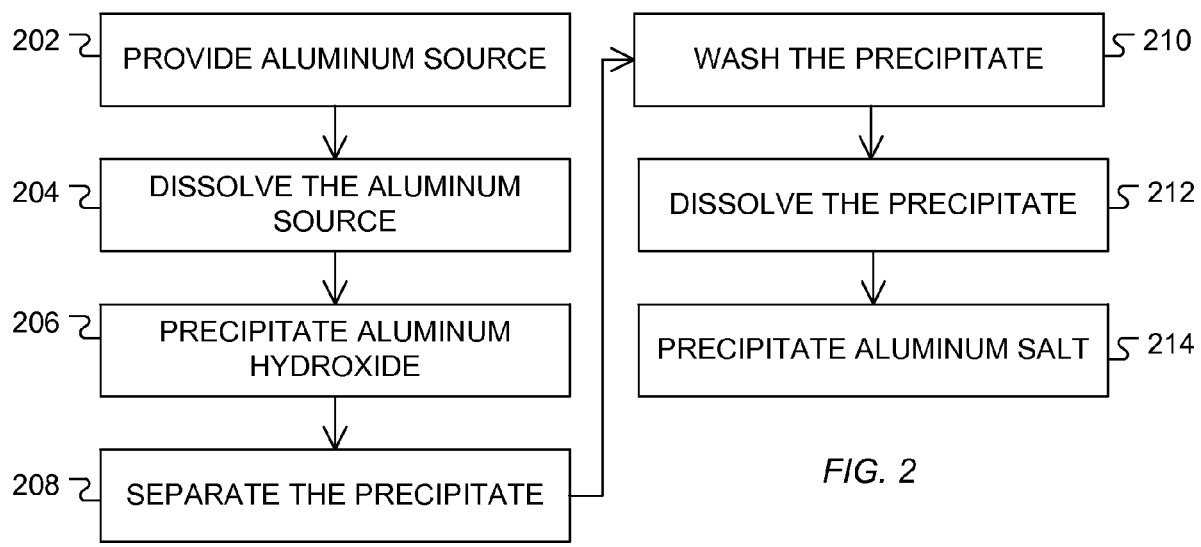
FIG. 2 includes a flow diagram illustration of an exemplary method to enhance the purity of an aluminum ion source.

In a particular example, FIG. 1 includes an illustration of an exemplary apparatus 100 and FIG. 2 includes a flow diagram of an exemplary method. As illustrated at 202, an aluminum source can be provided. The aluminum source may be an aluminum salt, such as a nitrate, carbonate, or any combination thereof, or a mineral form of aluminum, such as boehmite, sapphire, other aluminum oxide ceramics, or any combination thereof. Alternatively, the aluminum source may be a solution including aluminum ions.

In an example, a solution of aluminum ions is prepared, as illustrated at 204. For example, the source can be an aluminum salt, such as aluminum nitrate, and dissolving can include adding water, such as deionized water. In another example, a source of aluminum can be a mineral source and can be dissolved using an acid solution, such as a nitric acid solution. The solution of aluminum ions may be an aqueous solution and may have a pH of not greater than 4.0, such as not greater than 3.0 or not greater than 2.0.

The solution of aluminum ions can have contaminants in any concentration and through the method described below the level of contaminants can be reduced. In particular, the solution of aluminum ions and, by extension, the source of aluminum ions can have a concentration of alkali metal ions of at least 5 ppm. By concentration of alkali metal, it is meant that the solution or source has a concentration of at least one alkali metal ion at the stated concentration and the solution or source may have more than one alkali metal ion, each having at least the stated concentration. For example, the solution or source may have a concentration of alkali metal ions of at least 5 ppm, such as at least 6 ppm. In a further example, the solution or source may have a concentration of alkali metal ions of at least 100 ppm, such as at least 200 ppm, or even 400 ppm or more. In a particular example, the solution or source may have a concentration of sodium ions of at least 50 ppm, such as at least 100 ppm, at least 200 ppm, at least 400 ppm, or even at least 500 ppm or more. In another example, the solution or source may have a concentration of potassium ions of at least 5 ppm, such as at least 6 ppm, or even at least 6.5 ppm or more.

The aluminum ions are precipitated in the presence of tetraalkylammonium hydroxide, as illustrated at 206. For example, the pH of the solution can be adjusted using the tetraalkylammonium hydroxide. An exemplary tetraalkylammonium hydroxide includes tetramethylammonium hydroxide (($CH_3$)$_4$NOH), tetraethylammonium hydroxide, tetrapropylammonium hydroxide, tetrabutylammonium hydroxide, or any combination thereof. In a particular example, a sufficient amount of ($CH_3$)$_4$NOH aqueous solution is added to an Al($NO_3$)$_3$ aqueous solution to reach a pH in the range 4.1 to 8.4, such as a range of 4.8 to 6.0, or approximately pH 5, providing substantial completion of the reaction to form an aluminum hydroxide (e.g., Al(OH)$_3$.x$H_2$O) precipitate.

As illustrated in FIG. 1, an aluminum ion source, such as an aluminum salt or an aluminum ion solution, can be added to a tank 102 with an ultrasonic mixer. The aluminum salt can be aluminum nitrate, or the aluminum ion solution can be an aluminum nitrate solution. Optionally, additional water can be added, particularly where the source includes an aluminum salt. When the aluminum ions are in solution, tetraalkylammonium hydroxide (TAOH) can be added to the tank 102 to adjust the pH and facilitate precipitation of aluminum hydroxide.

Once formed, the Al(OH)$_3$.x$H_2$O precipitate is separated from impurities that remain in solution by removing a substantial portion of the remaining solution. Returning to FIG. 2, the aluminum hydroxide can be concentrated or dewatered and washed. For example, the aluminum hydroxide can be at least partially separated, as illustrated at 208, in a separator and washed, as illustrated at 210. For example, the Al(OH)$_3$.x$H_2$O precipitate may be separated by filtration, sedimentation, or centrifugation. In the example illustrated in FIG. 1, the aluminum hydroxide can be separated using a centrifuge 104.

Once separated, the precipitate may be washed. In addition, the aluminum hydroxide can be washed in the centrifuge 104. In particular, separating and washing can be performed concurrently in the centrifuge 104. The wash solution may be an aqueous solution and may have an alkali metal concentration of not greater than 2 ppm, such as not greater than 1 ppm. Further, the wash solution may have a pH in a range of 4.1 to 8.4, such as a range of 6.0 to 8.0, or approximately neutral. For example, the precipitate may be washed with purified water, such as deionized (DI) water. Alternatively, the wash solution can include small amount of acid or a small amount of base. For example, the wash solution can be a low concentration nitric acid solution. In another example, the wash solution can be a low concentration tetraalkylammonium hydroxide solution. In a particular example, the wash solution is heated to a temperature in a range of 60° C. to 100° C., such as a range of 70° C. to 90° C., or approximately 80° C. Alternatively, the DI water can be room temperature or can be chilled, for example, to a temperature in a range of 1° C. to 23° C. The wash water may be tested for the presence of univalent and divalent cations, such as those described above, to determine the effectiveness of the washing procedure. Similarly, the precipitate may be tested for the effectiveness of the precipitation.

In a particular example, dewatering and washing the precipitate is performed by using the centrifuge 104. During this process, the particles are collected by the centrifuge on the walls of the unit as the water is removed from the system. DI water is processed through the centrifuge for a duration and flow rate to wash the precipitate to a desirable level, such as a low concentration of alkali metal ions. Such washing provides for separating undesired impurities, such as univalent and divalent cations, from the precipitate.

Following separation and washing, the precipitate may be dissolved to provide a source of aluminum ions having a desirable purity, as illustrated at 212. For example, the Al(OH)$_3$.x$H_2$O precipitate may be dissolved in an acid, such as a concentrated nitric acid, in a container 106 to convert the precipitate to an aluminum ion solution, such as an aluminum nitrate solution. In particular, the acid solution can have an alkali metal ion concentration of not greater than 2 ppm, such as not greater than 1 ppm. In an example, the precipitate may be dissolved to form a solution have a pH of not greater than 4.0. In addition, the procedure may be repeated to further improve purity of the aluminum ion source.

The resulting aluminum ion containing solution has an alkali metal concentration of not greater than 2 ppm, such as not greater than 1 ppm, or even not greater than 0.5 ppm. For example, the solution can have a sodium concentration of not greater than 1 ppm, such as not greater than 0.7 ppm, or not greater than 0.5 ppm. In another example, the solution can have a potassium concentration of not greater than 1 ppm, such as not greater than 0.7 ppm, not greater than 0.5 ppm, or even not greater than 0.4 ppm.

Optionally, an aluminum salt can be formed from the aluminum ion containing solution, as illustrated at 214. For example, an aluminum nitrate precipitate can be formed from the solution by increasing the nitrate concentration, for example, by removing water, adding a nitrate source (e.g., ammonium nitrate), or a combination thereof; by decreasing the temperature of the solution; or by both increasing the nitrate concentration and decreasing the temperature.

The process can be repeated to further improve purity. In an example, the aluminum nitrate may be transferred to a DI water filled ultrasonic tank 102.

In an alternative example, the aluminum ion solution may be used to form a coating over dielectric particulate. For example, the aluminum ions may be used to form an alumina, alumina silicate, or other aluminum-containing ceramic coating around particles of dielectric ceramic, such as composition-modified barium titanate. In an example, an aluminum nitrate solution is added to a suspension or dispersion of composition-modified barium titanate particles. The aluminum nitrate solution may be a super-saturated solution. In an example, the mixture of the aluminum nitrate solution and dispersion of the composition-modified barium titanate particles is boiled to super-saturate aluminum nitrate to facilitate deposition of the aluminum nitrate on the surface of the composition-modified barium titanate particles. The coated particles are flash dried at a temperature in a range of 80° C. to 110° C., such as approximately 98° C. The dried particulate is treated at a temperature in a range of 300° C. to 900° C., such as approximately 800° C. to convert the aluminum nitrate to alumina. In particular, a resulting alumina coating may have a voltage breakdown of at least 8 MV/cm, such as at least 9 MV/cm, at least 10 MV/cm, or even at least 11 MV/cm.

EXAMPLE

A procedure for forming aluminum nitrate substantially free of sodium and potassium ions is performed. Sodium and potassium ions are highly mobile and can lower the voltage breakdown if present in a film or material of a capacitor.

A 60 wt % Al($NO_3$)$_3$ aqueous solution available from Blue Line Corp. located in San Antonio, Tex. is used as a stock solution. Before and after purification, solutions are analyzed on a Perkin Elmer Optima 2100DV ICP-OES. Two calibration curves are generated for both sodium and potassium; one for low concentrations (0.0500 ppm to 0.500 ppm) and one for high concentrations (0.500 pmm to 7.50 ppm). Standards used in the calibration are based on stock solutions from High Purity Standards, Inc. and the resulting calibration curves have correlation coefficients greater than 0.998. Dilutions, if made, are made with the use of 18 megaohm deionized water with no detectable metal ions.

Initially, the 60 wt % Al(NO$_3$)$_3$ stock solution contains 440 ppm sodium and 6.13 ppm potassium. Tetramethylammonium hydroxide is added to the stock solution to a pH of approximately 5 to provide a precipitate. The resulting precipitate is decanted and centrifuged with a water wash of DI water at 80° C. The washed precipitate is dissolved in nitric acid to form an aluminum nitrate solution. After one application of the purification process and re-concentrating the solution to 60 wt % Al(NO$_3$)$_3$, the concentration of sodium to 0.492 ppm and 0.367 ppm potassium. Additional applications of the purification procedure did not decrease concentrations of either sodium or potassium, most likely due to the reagents being certified to only 1 ppm or less.

Such concentration levels of sodium and potassium are sufficient for use in an aluminum nitrate coating process. An alumina coating is formed on a composition modified barium titanate particulate. The coating process is based on precipitation from a super-saturated solution of aluminum nitrate. Only a small fraction of the metal-ions contaminants precipitate with the aluminum ions during the coating process. By starting with concentration levels at 500 ppb or less, as produced by the purification process, levels of sodium and potassium in the coating are in the low parts-per-trillion range.

Analysis indicates that aluminum oxide layers achieved a breakdown voltage of 11±1 MVcm$^{-1}$ or 1,100 V/μm.

Coating the composition modified barium titanate (CMBT) powders with a purified aluminum oxide film provides technical advantages. In particular, the coatings increase voltage breakdown capability of capacitors fabricated with coated powders. The aluminum oxide coating of the CMBT powders provides addition protection by limiting or significantly reducing the loss of oxygen from the body of the powders when voltage is applied to a capacitor that is fabricated using CMBT powders. The coated powders significantly reduce the transfer of mobile ions from the CMBT powders due to the excellent high resistance as indicated above that purified aluminum oxide layers provide. The coated powders provide particle-to-particle isolation such that, if particles touch in a glass or plastic matrix, the loss of relative permittivity due to dipole energy interaction between crystallites is limited. Maintaining the permittivity is provided by the high voltage breakdown and sealing capability of the aluminum oxide protective layer.

In a first embodiment, a method of purifying an aluminum source includes dissolving an aluminum ion source to provide a first solution including aluminum ions having a pH of not greater than 4.0, adjusting the pH of the first solution with a tetraalkylammonium hydroxide solution to a pH in range of 4.1 to 8.4, thereby forming an aluminum hydroxide precipitate, separating the aluminum hydroxide precipitate from the first solution, washing the separated aluminum hydroxide precipitate with an aqueous solution having a pH in a range of 4.1 to 8.4, dissolving the washed aluminum hydroxide precipitate using an acid to provide a second solution having a pH of not greater than 4.0, and forming an aluminum salt from the second solution.

In a second embodiment, a method of purifying an aluminum source includes adjusting the pH of first solution including aluminum ions and having a pH of not greater than 4.0 with a tetraalkylammonium hydroxide solution to a pH in a range of 4.1 to 8.4 thereby forming an aluminum hydroxide precipitate, washing the aluminum hydroxide precipitate with an aqueous solution having a pH in a range of 4.1 to 8.4 and an alkali metal concentration of not greater than 1 ppm, and dissolving the washed aluminum hydroxide precipitate using an acid to provide a second solution having a pH of not greater than 4.0. The second solution has an alkali metal concentration of not greater than 1 ppm.

In a third embodiment, a method of purifying an aluminum source includes precipitating an aluminum hydroxide precipitate from a first solution including an aluminum ion source and having a pH of not greater than 4.0 by adding a tetraalkylammonium hydroxide solution to adjust the first solution pH to in a range of 4.1 to 8.4, separating the aluminum hydroxide precipitate from the first solution, washing the aluminum hydroxide precipitate with an aqueous solution having a pH in a range of 4.1 to 8.4 and an alkali metal concentration of not greater than 1 ppm, and dissolving the washed aluminum hydroxide precipitate using an acid to provide a second solution having a pH of not greater than 4.0. The second solution has an alkali metal concentration of not greater than 1 ppm.

In an example of the preceding embodiments and examples, adjusting the pH of the first solution includes adjusting the pH to a range of 4.8 to 6.0. In another example of the preceding embodiments and examples, the first solution has a pH of not greater than 3.0. In a further example of the preceding embodiments and examples, the aqueous solution has a pH in a range of 6.0 to 8.0.

In an additional example of the preceding embodiments and examples, the aqueous solution is purified water. For example, the purified water is deionized water.

In another example of the second embodiment, the method further includes separating the aluminum hydroxide precipitate from the solution. In an example of the preceding embodiments and examples, separating and washing are performed in a centrifuge. In an additional example of the preceding embodiments and examples, separating and washing are performed concurrently in a centrifuge.

In a further example of the preceding embodiments and examples, dissolving the aluminum ion source includes dissolving an aluminum salt. In additional example of the preceding embodiments and examples, dissolving the washed aluminum hydroxide precipitate includes dissolving the aluminum hydroxide precipitate with nitric acid. In another example of the preceding embodiments and examples, dissolving the washed aluminum hydroxide precipitate includes dissolving the aluminum hydroxide precipitate with the acid, the acid having an alkali metal concentration of not greater than 1 ppm.

In an additional example of the preceding embodiments and examples, washing the separated aluminum hydroxide includes washing with an aqueous solution having an alkali metal concentration of not greater than 1 ppm. In another example of the preceding embodiments and examples, washing includes washing with an aqueous solution having a temperature in a range of 60° C. to 100° C.

In an example of the preceding embodiments and examples, the second solution has an alkali metal concentration of not greater than 1 ppm. In a further example of the preceding embodiments and examples, the alkali metal concentration is not greater than 0.5 ppm.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below.

Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of purifying an aluminum source, the method comprising:
    dissolving an aluminum ion source to provide a first solution including aluminum ions having a pH of not greater than 4.0;
    adjusting the pH of the first solution with a tetraalkylammonium hydroxide solution to a pH in range of 4.1 to 8.4 thereby forming an aluminum hydroxide precipitate;
    separating the aluminum hydroxide precipitate from the first solution;
    washing the separated aluminum hydroxide precipitate with an aqueous solution having a pH in a range of 4.1 to 8.4;
    dissolving the washed aluminum hydroxide precipitate using an acid to provide a second solution having a pH of not greater than 4.0; and
    forming an aluminum salt from the second solution.

2. The method of claim 1, wherein adjusting the pH of the solution includes adjusting the pH to a range of 4.8 to 6.0.

3. The method of claim 1, wherein the pH of the first solution is not greater than 3.0.

4. The method of claim 1, wherein the aqueous solution has a pH in a range of 6.0 to 8.0.

5. The method of claim 1, wherein the aqueous solution is purified water.

6. The method of claim 5, wherein the purified water is deionized water.

7. The method of claim 1, wherein separating and washing are performed in a centrifuge.

8. The method of claim 1, wherein separating and washing are performed concurrently in a centrifuge.

9. The method of claim 1, wherein dissolving the aluminum ion source includes dissolving an aluminum salt.

10. The method of claim 1, wherein dissolving the washed aluminum hydroxide precipitate includes dissolving the aluminum hydroxide precipitate with nitric acid.

11. The method of claim 1, wherein dissolving the washed aluminum hydroxide precipitate includes dissolving the aluminum hydroxide precipitate with the acid, the acid having an alkali metal concentration of not greater than 1 ppm.

12. The method of claim 1, wherein washing the separated aluminum hydroxide includes washing with an aqueous solution having an alkali metal concentration of not greater than 1 ppm.

13. The method of claim 1, wherein washing includes washing with an aqueous solution having a temperature in a range of 60° C. to 100° C.

14. The method of claim 1, wherein the second solution has an alkali metal concentration of not greater than 1 ppm.

15. The method of claim 14, wherein the alkali metal concentration is not greater than 0.5 ppm.

16. A method of purifying an aluminum source, the method comprising:
    adjusting the pH of a first solution including aluminum ions and having a pH of not greater than 4.0 with a tetraalkylammonium hydroxide solution to a pH in a range of 4.1 to 8.4, thereby forming an aluminum hydroxide precipitate;
    washing the aluminum hydroxide precipitate with an aqueous solution having a pH in a range of 4.1 to 8.4 and an alkali metal concentration of not greater than 1 ppm; and
    dissolving the washed aluminum hydroxide precipitate using an acid to provide a second solution having a pH of not greater than 4.0, the second solution having an alkali metal concentration of not greater than 1 ppm.

17. The method of claim 16, wherein adjusting the pH of the first solution includes adjusting the pH to a range of 4.8 to 6.0.

18. The method of claim 16, wherein the aqueous solution has a pH in a range of 6.0 to 8.0.

19. The method of claim 16, wherein the aqueous solution is purified water.

20. The method of claim 16, further comprising separating the aluminum hydroxide precipitate from the first solution.

21. The method of claim 20, wherein separating and washing are performed in a centrifuge.

22. The method of claim 16, wherein washing include washing with an aqueous solution having a temperature in a range of 60° C. to 100° C.

23. A method of purifying an aluminum source, the method comprising:
    precipitating an aluminum hydroxide precipitate from a first solution including an aluminum ion source and having a pH of not greater than 4.0 by adding a tetraalkylammonium hydroxide solution to adjust the first solution pH to in a range of 4.1 to 8.4;
    separating the aluminum hydroxide precipitate from the first solution;
    washing the aluminum hydroxide precipitate with an aqueous solution having a pH in a range of 4.1 to 8.4 and an alkali metal concentration of not greater than 1 ppm; and
    dissolving the washed aluminum hydroxide precipitate using an acid to provide a second solution having a pH of not greater than 4.0, the second solution having an alkali metal concentration of not greater than 1 ppm.

* * * * *